(12) United States Patent
Liu et al.

(10) Patent No.: US 12,366,290 B2
(45) Date of Patent: Jul. 22, 2025

(54) SPEED REDUCER CASING AND ELECTRIC DRIVE ASSEMBLY

(71) Applicant: Jing-Jin Electric Technologies Co., Ltd., Beijing (CN)

(72) Inventors: Yang Liu, Beijing (CN); Jianwen Li, Beijing (CN); Fayu Pan, Beijing (CN); Yanan Huang, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 18/293,964

(22) PCT Filed: May 16, 2022

(86) PCT No.: PCT/CN2022/093088
§ 371 (c)(1),
(2) Date: Jan. 31, 2024

(87) PCT Pub. No.: WO2023/010946
PCT Pub. Date: Feb. 9, 2023

(65) Prior Publication Data
US 2024/0337314 A1    Oct. 10, 2024

(30) Foreign Application Priority Data
Aug. 3, 2021 (CN) .......................... 202121795244.5

(51) Int. Cl.
*F16H 57/04* (2010.01)
*B60K 1/00* (2006.01)
(Continued)

(52) U.S. Cl.
CPC ........... *F16H 57/0417* (2013.01); *B60K 1/00* (2013.01); *F16H 57/029* (2013.01);
(Continued)

(58) Field of Classification Search
CPC .. F16H 57/0417; F16H 57/029; F16H 57/031; F16H 57/0424; F16H 57/045;
(Continued)

(56) References Cited

U.S. PATENT DOCUMENTS 3,736,812 A    6/1973  Wellauer
6,206,089 B1 *  3/2001  Uchikawa ............... F28F 13/06
                                                             165/154

(Continued)

FOREIGN PATENT DOCUMENTS

CN    109707825 A    5/2019
CN    110630731 A    12/2019
(Continued)

OTHER PUBLICATIONS

International Search Report in PCT/CN2022/093088, mailed Jun. 30, 2022, 5 pages.

*Primary Examiner* — Toan C To
(74) *Attorney, Agent, or Firm* — ARENTFOX SCHIFF LLP

(57) ABSTRACT

A reducer housing and an electric drive assembly are disclosed. A liquid cooled heat dissipation structure is provided at a bottom of the reducer housing and/or on a side wall thereof through which lubricating oil flows. The heat dissipation structure includes a coolant tank and a cover plate that seals the coolant tank. Two ends of the coolant tank are respectively provided with a liquid inlet and a liquid outlet. Convex structures and concave structures are alternately provided on the bottom of coolant tank so that inner and outer sides of the bottom of the coolant tank are in a wavy shape to increase a contact area between the coolant tank and the lubricating oil inside the reducer housing.

17 Claims, 2 Drawing Sheets

(51) Int. Cl.
*F16H 57/029* (2012.01)
*F16H 57/031* (2012.01)
*F16H 57/02* (2012.01)

(52) U.S. Cl.
CPC ....... *F16H 57/031* (2013.01); *F16H 57/0424* (2013.01); *F16H 57/045* (2013.01); *F16H 57/0457* (2013.01); *F16H 57/0476* (2013.01); *F16H 2057/02026* (2013.01); *F16H 2057/02034* (2013.01); *F16H 2057/02043* (2013.01)

(58) Field of Classification Search
CPC ............. F16H 57/0457; F16H 57/0476; F16H 2057/02026; F16H 2057/02034; F16H 2057/02043; B60K 1/00
See application file for complete search history.

(56) References Cited

U.S. PATENT DOCUMENTS

| | | | | |
|---|---|---|---|---|
| 10,914,532 | B2* | 2/2021 | Kim | F28D 21/0007 |
| 11,118,848 | B2* | 9/2021 | Zhang | F28F 3/025 |
| 12,013,190 | B2* | 6/2024 | Strange | B23P 15/26 |
| 2004/0206482 | A1* | 10/2004 | Bang | F28D 1/0435 |
| | | | | 29/890.03 |
| 2006/0243429 | A1* | 11/2006 | Chu | F28F 3/025 |
| | | | | 165/177 |
| 2007/0209783 | A1* | 9/2007 | Rohellec | F28F 9/0263 |
| | | | | 165/145 |
| 2008/0202735 | A1* | 8/2008 | Geskes | F28D 9/0043 |
| | | | | 165/157 |
| 2021/0129660 | A1* | 5/2021 | Bradfield | F16N 7/38 |
| 2021/0254896 | A1* | 8/2021 | Borghese | F28F 21/084 |
| 2021/0408854 | A1* | 12/2021 | Wang | H02K 1/28 |
| 2022/0090534 | A1* | 3/2022 | Friske | B60K 1/00 |
| 2022/0275858 | A1* | 9/2022 | Kobayashi | H02M 7/003 |
| 2023/0402901 | A1* | 12/2023 | Xu | B60K 1/00 |
| 2024/0175486 | A1* | 5/2024 | Stefani | F16H 57/0424 |

FOREIGN PATENT DOCUMENTS

| | | |
|---|---|---|
| CN | 111927942 A | 11/2020 |
| CN | 212063728 | 12/2020 |
| CN | 212643503 | 3/2021 |
| CN | 212690794 | 3/2021 |
| CN | 216158238 | 4/2022 |

* cited by examiner

SPEED REDUCER CASING AND ELECTRIC DRIVE ASSEMBLY

CROSS REFERENCING OF RELATED APPLICATIONS

This application is a National Phase of PCT/CN2022/093088 filed on May 16, 2022, which claims priority from the to Chinese patent application No. 202121795244.5 filed on Aug. 3, 2021, the contents of each of which are hereby incorporated by reference in their entireties.

TECHNICAL FIELD

The present utility model belongs to the technical field of cooling of a reducer, and particularly relates to a reducer housing and an electric drive assembly.

BACKGROUND

At present, the main cooling method for a reducer in new energy vehicles is cooling by stirring oil with a gear, in which the lubricating oil inside the reducer housing is stirred by a gear so that the lubricating oil flows to the gears, bearings, and other positions along with the stirring of gear, thereby taking away the heat generated during the operation of reducer and achieving cooling.

Since new energy vehicles have to face various complex road conditions, and the rotational speed of the motor in new energy vehicles is getting faster, the requirement about temperature rise in the entire vehicle is also increasing. Considering the need to balance the temperature rise and service life, the cooling method only by stirring oil with a gear is no longer sufficient to meet the development requirements of new energy vehicles for high power, high torque, and balance between maximum speed and maximum service life.

SUMMARY

With respect to the above problems, the present disclosure provides a reducer housing and an electric drive assembly in order to overcome or at least partially solve the above problems.

In order to achieve the above object, the present utility model adopts the following technical solutions.

An aspect of the present disclosure provides a reducer housing, wherein a liquid cooled heat dissipation structure is provided at a bottom of the reducer housing and/or on a side wall of the reducer housing through which lubricating oil flows;

the liquid cooled heat dissipation structure comprises a coolant tank and a cover plate, the cover plate is used to seal the coolant tank, and two ends of the coolant tank are respectively provided with a liquid inlet and a liquid outlet;

several convex structures and concave structures are alternately provided on the bottom of coolant tank, so that inner and outer sides of the bottom of the coolant tank are both in a wavy shape, thereby increasing a contact area between the coolant tank and the lubricating oil inside the reducer housing.

Further, the cover plate or the side wall of the coolant tank are provided thereon with several flow guiding plates, the flow guiding plates are vertical to the bottom of the coolant tank, the positions of flow guiding plates correspond to the positions of concave structures, and the flow guiding plates cooperate with the convex structures to form a continuous S-shaped passage for the coolant to flow through.

Further, an amplitude of a wavy bottom of the coolant tank decreases in steps from the liquid inlet to the liquid outlet.

Further, the liquid cooled heat dissipation structure and the reducer housing are integrally molded.

Further, a sealing ring is provided between the coolant tank and the cover plate.

Further, the coolant tank and the cover plate are fixed by bolts/screws or by welding.

Another aspect of the present disclosure provides an electric drive assembly comprising a motor unit and a reducer unit. The motor unit comprises a motor housing, and the reducer unit comprises a reducer housing as described above.

Further, the liquid inlet is communicated with a coolant passage inside a motor water jacket;
or
the liquid inlet is communicated with an outlet of a motor coolant passage.

Further, an oil guide rib and an oil collection tank are provided inside the reducer housing, the oil guide rib is used to guide the lubricating oil splashed by the reducer gear into the oil collection tank as well as the parts to be lubricated and the parts to be cooled inside the reducer housing, the lubricating oil in the oil collection tank is transferred to the parts to be lubricated and the parts to be cooled inside the motor housing through an oil passage.

Further, an oil blocking plate or an oil blocking rib is provided inside the reducer housing.

The advantages and beneficial effects of the present utility model are as follows.

In the reducer housing of the present disclosure, by providing the coolant tank at the bottom of the reducer housing and/or on the side wall through which lubricating oil flows, and alternately providing several convex and concave structures at the bottom of the coolant tank so that the inner and outer surfaces of the bottom of the coolant tank are both in a wavy shape to increase the contact area between the coolant tank and the lubricating oil inside the reducer housing, the heat exchange between the coolant in the cooling tank and the lubricating oil can be achieved, thereby quickly removing the heat inside the reducer housing, improving the heat dissipation performance of the reducer, and thus increasing the service life of the reducer.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
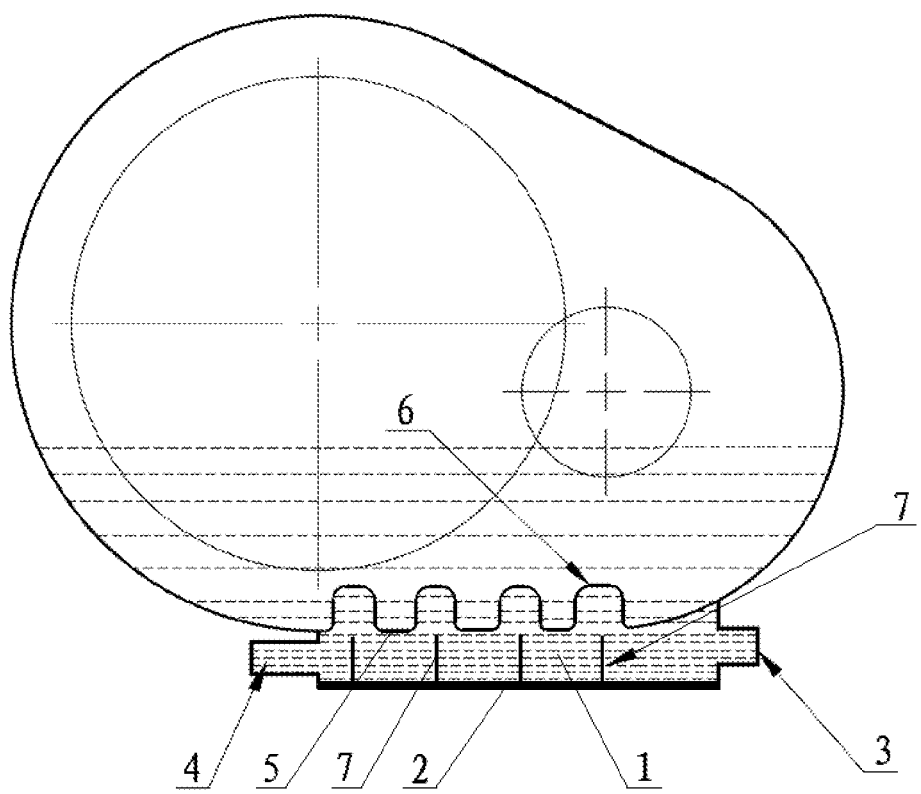
FIG. 1 is a schematic cross-sectional view of the structure of a reducer housing according to an embodiment of the present utility model.

In the drawings: 1. coolant tank; 2. cover plate; 3. liquid inlet; 4. liquid outlet; 5. convex structure; 6. concave structure; 7. flow guiding plate; 8. motor housing; 9. oil guiding rib; 10. oil collection tank; 11. oil passage; 12. oil blocking rib.

DETAILED DESCRIPTION

In order to make the object, technical solutions, and advantages of the present disclosure clearer, the present disclosure will be described clearly and completely in conjunction with the specific embodiments and corresponding drawings. Obviously, the embodiments described are only part of rather than all of the embodiments of the present disclosure. Based on the embodiments in the present disclosure, all other embodiments obtained by a person of ordinary skill in the art without paying creative work shall fall within the protection scope of the present disclosure.

The technical solutions provided in embodiments of the present utility model will be explained in detail below in conjunction with the accompanying drawings.

Figure 2:
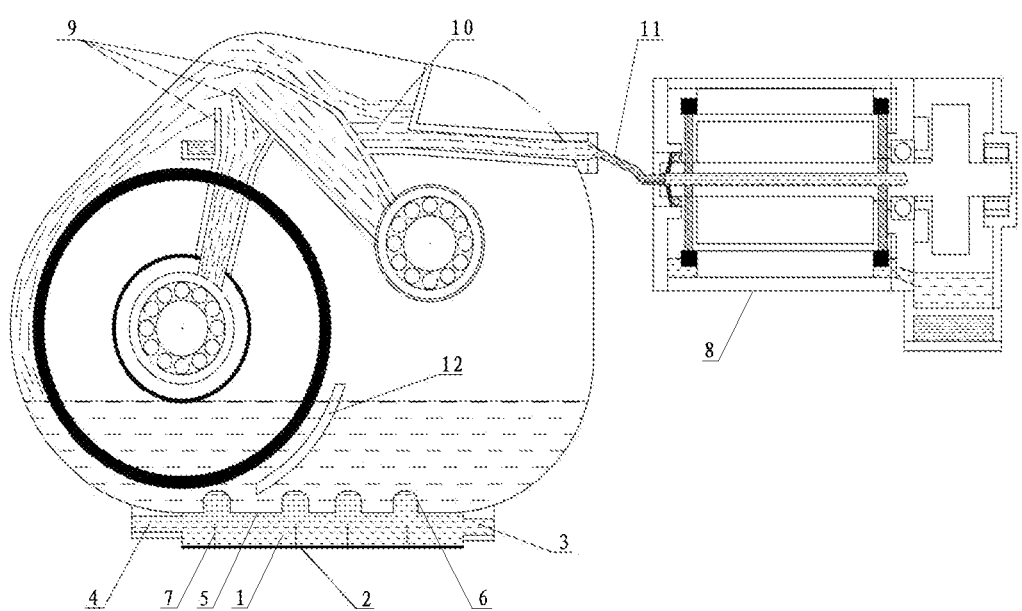
FIG. 2 is a schematic diagram of the structure of an electric drive assembly according to an embodiment of the present utility model.

In an embodiment of the present disclosure, a reducer housing is disclosed. A liquid cooled heat dissipation structure is provided at the bottom of the reducer housing and/or on the side wall of the reducer housing through which the lubricating oil flows, as shown in FIGS. 1 and 2. The liquid cooled heat dissipation structure comprises a coolant tank 1 and a cover plate 2. The cover plate 2 is used to seal the coolant tank 1. Two ends of the coolant tank 1 are respectively provided with a liquid inlet 3 and a liquid outlet 4. The positions of the liquid inlet 3 and the liquid outlet 4 can be interchanged. There may be one or more liquid cooling heat dissipation structures on the reducer housing. When there are multiple liquid cooling heat dissipation structures on the reducer housing, these multiple liquid cooling heat dissipation structures are arranged in series or parallel.

When the liquid cooled heat dissipation structure is provided at the bottom of the reducer housing, in order to improve the heat dissipation performance of the reducer, the liquid cooled heat dissipation structure can be laid flat at the bottom of the entire reducer housing.

Several convex structures 5 and concave structures 6 are alternately provided on the bottom of the coolant tank 1, so that the inner and outer sides of the bottom of the coolant tank 1 are both in a wavy shape, thereby increasing the contact area between the coolant and the bottom of coolant tank 1 to promote heat dissipation. The amplitude of the wavy shape can be adjusted. When the outer side of the bottom of the coolant tank 1 comes into contact with the lubricating oil, the wavy bottom can effectively increase the contact area between the coolant tank 1 and the lubricating oil inside the reducer housing, thereby promoting heat exchange. The convex structure 5 is a protrusion with respect to the bottom of the coolant tank 1, and the concave structure 6 is a depression with respect to the bottom of the coolant tank 1. In addition, the depth of the convex structure 5 and the concave structure 6 can be adjusted according to the position of the gears inside the reducer housing.

The coolant enters the coolant tank 1 through the liquid inlet 3 and exchanges heat with the lubricating oil inside the reducer housing through the convex structure 5 and the concave structure 6, thereby reducing the temperature of the lubricating oil.

In sum, in the reducer housing of this embodiment, by providing the coolant tank at the bottom of the reducer housing and/or on the side wall through which lubricating oil flows, and alternately providing several convex and concave structures at the bottom of the coolant tank so that the inner and outer surfaces of the bottom of the coolant tank are both in a wavy shape to increase the contact area between the coolant tank and the lubricating oil inside the reducer housing, the heat exchange between the coolant in the cooling tank and the lubricating oil can be achieved, thereby quickly removing the heat inside the reducer housing, improving the heat dissipation performance of the reducer, and thus increasing the service life of the reducer.

In an embodiment, as shown in FIGS. 1 and 2, the cover plate 2 or the side wall of the coolant tank 1 are provided thereon with several flow guiding plates 7, the flow guiding plates 7 are vertical to the bottom of the coolant tank 1. The number of flow guiding plates 7 is consistent with the number of concave structures 6, and the positions of flow guiding plates 7 correspond to the positions of concave structures 6. The flow guiding plates 7 cooperate with the convex structures 5 to form a continuous S-shaped passage for the coolant to flow through, allowing the coolant to flow up and down in an S-shape in the coolant tank 1.

In an embodiment, the amplitude of the wavy bottom of the coolant tank 1 decreases in steps from the liquid inlet 3 to the liquid outlet 4, thereby avoiding blind areas in coolant flow and increasing the heat dissipation efficiency.

In an embodiment, the liquid cooled heat dissipation structure and the reducer housing are integrally molded, thereby making the reducer structure more compact and saving manufacturing process. In addition, the liquid cooling heat dissipation structure does not need precision machining during manufacturing, so that disturbance occurs when the coolant flows in the coolant tank, thereby facilitating heat exchange between the coolant and the bottom of the coolant tank.

In an embodiment, a sealing ring is provided between the coolant tank 1 and the cover plate 2 for sealing between the coolant tank 1 and the cover plate 2 to prevent the coolant from flowing out.

Furthermore, the coolant tank 1 and the cover plate 2 are fixed by bolts/screws or by welding. Of course, the coolant tank 1 and the cover plate 2 may also be fixed by other means, which is also within the protection scope of the present disclosure.

In an embodiment of the present disclosure, an electric drive assembly is disclosed. The electric drive assembly comprises a motor unit and a reducer unit. As shown in FIG. 2, the motor unit comprises a motor housing 8, and the reducer unit comprises a reducer housing as described in any of the above embodiments. The electric drive assembly has excellent heat dissipation performance, can meet the needs of long-term, high-power, high torque, and high speed work under various working conditions, and improve the reliability of the vehicle power system as well as the reliability of the entire vehicle.

In an embodiment, the liquid inlet 3 may be provided on an end face of the reducer housing that connects the motor housing 8, and the liquid inlet 3 is connected to a coolant passage inside a motor water jacket through a passage provided on the motor housing. The circulating coolant enters the coolant tank 1 directly from the motor coolant passage through the liquid inlet 3 provided on the reducer housing at the joint surface.

Alternatively, a fitting may be provided at the liquid inlet 3, and the liquid inlet 3 is connected to an outlet of a motor coolant passage through a coolant pipeline. The circulating coolant flows out from the outlet of the motor coolant passage, passes through the external coolant pipeline, enters the liquid inlet 3 provided on an outer wall of the coolant tank 1, and thus enters the coolant tank 1.

The design of connecting the coolant tank 1 with the motor coolant passage allows the reducer and the motor to share one coolant circulation system, thereby saving the heat dissipation cost of the vehicle power system.

In an or some embodiments, as shown in FIG. 2, an oil guide rib 9 and an oil collection tank 10 are provided inside the reducer housing. The oil guide rib 9 is used to guide the lubricating oil splashed by the reducer gear into the oil collection tank 10 and the parts to be lubricated and the parts to be cooled inside the reducer housing. The lubricating oil in the oil collection tank 10 is transferred to the parts to be lubricated and the parts to be cooled inside the motor housing 8 through an oil passage 11, thereby achieving the lubrication and cooling of the parts. The parts to be cooled include bearings, gears, motor coils, motor rotors, etc. The parts to be lubricated include bearings, gears, oil seals, etc.

In an embodiment, as shown in FIG. 2, an oil blocking plate or an oil blocking rib 12 is provided inside the reducer housing, which can reduce the amount of lubricating oil splashed by the reducer gear during rotation, and thus reduce the power loss caused by the reducer gear's oil stirring.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

What is claimed is:

1. A reducer housing comprising:
   a liquid cooled heat dissipation structure at a bottom of the reducer housing and/or on a side wall of the reducer housing through which lubricating oil flows;
   the liquid cooled heat dissipation structure including a coolant tank and a cover plate configured to seal the coolant tank, the coolant tank including two ends that are respectively provided with a liquid inlet and a liquid outlet; and
   a plurality of convex structures and concave structures that are alternately disposed on a bottom of coolant tank so that two sides of the bottom of the coolant tank are both in a wavy shape,
   wherein the cover plate or the side wall of the coolant tank are provided thereon with a plurality of flow guiding plates that are vertical to the bottom of the coolant tank and are disposed at positions that correspond to positions of the concave structures, the flow guiding plates configured to cooperate with the convex structures to form a continuous S-shaped passage for coolant to flow through.

2. The reducer housing according to claim 1, wherein an amplitude of a wavy bottom of the coolant tank decreases gradually from the liquid inlet to the liquid outlet.

3. The reducer housing according to claim 2, further comprising a sealing ring between the coolant tank and the cover plate.

4. An electric drive assembly comprising a motor unit that includes a motor housing and a reducer unit that comprises the reducer housing according to claim 2.

5. The reducer housing according to claim 1, wherein the liquid cooled heat dissipation structure and the reducer housing are integrally molded.

6. The reducer housing according to claim 5, further comprising a sealing ring between the coolant tank and the cover plate.

7. An electric drive assembly comprising a motor unit that includes a motor housing and a reducer unit that comprises the reducer housing according to claim 5.

8. The reducer housing according to claim 1, further comprising any sealing ring between the coolant tank and the cover plate.

9. The reducer housing according to claim 8, wherein the coolant tank and the cover plate are fixed by bolts/screws or by welding.

10. An electric drive assembly comprising a motor unit that includes a motor housing and a reducer unit that comprises the reducer housing according to claim 9.

11. An electric drive assembly comprising a motor unit that includes a motor housing and a reducer unit that comprises the reducer housing according to claim 8.

12. An electric drive assembly comprising a motor unit and a reducer unit, wherein the motor unit comprises a motor housing and the reducer unit comprises the reducer housing according to claim 1.

13. The electric drive assembly according to claim 12, wherein the liquid inlet is communicated with a coolant passage inside a motor water jacket; or the liquid inlet is connected to an outlet of a motor coolant passage.

14. The electric drive assembly according to claim 13, further comprising at least one of an oil blocking plate and an oil blocking rib provided inside the reducer housing.

15. The electric drive assembly according to claim 12, wherein an oil guide rib and an oil collection tank are provided inside the reducer housing, the oil guide rib configured to guide lubricating oil splashed by a reducer gear into the oil collection tank as well as parts to be lubricated and parts to be cooled inside the reducer housing, and an oil passage is configured to transfer the lubricating oil in the oil collection tank to the parts to be lubricated and the parts to be cooled inside the motor housing.

16. The electric drive assembly according to claim 15, further comprising at least one of an oil blocking plate and an oil blocking rib inside the reducer housing.

17. The electric drive assembly according to claim 12, further comprising at least one of an oil blocking plate and an oil blocking rib inside the reducer housing.

* * * * *